(12) United States Patent
Cadigan, Jr. et al.

(10) Patent No.: US 8,982,886 B2
(45) Date of Patent: *Mar. 17, 2015

(54) MEMORY SAVING PACKET MODIFICATION

(71) Applicant: International Business Machines Corporation, Armonk, NY (US)

(72) Inventors: Michael J. Cadigan, Jr., Poughkeepsie, NY (US); Nihad Hadzic, Poughkeepsie, NY (US); Jeffrey M. Turner, Poughkeepsie, NY (US); Raymond Wong, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,401

(22) Filed: Nov. 14, 2012

(65) Prior Publication Data
US 2013/0070771 A1 Mar. 21, 2013

Related U.S. Application Data

(63) Continuation of application No. 13/117,345, filed on May 27, 2011.

(51) Int. Cl.
*H04L 12/28* (2006.01)
*H04J 3/17* (2006.01)
(Continued)

(52) U.S. Cl.
CPC ............... *H04L 69/22* (2013.01); *H04L 43/02* (2013.01); *H04L 43/04* (2013.01)
USPC ........... 370/390; 370/392; 370/432; 370/474; 709/236; 710/30; 711/202

(58) Field of Classification Search
CPC .......... H04L 43/04; H04L 43/02; H04L 69/22
USPC ................. 370/328, 338, 392, 390, 434, 474; 709/236; 710/30; 711/202
See application file for complete search history.

(56) References Cited

U.S. PATENT DOCUMENTS

| | | | |
|---|---|---|---|
| 5,398,245 | A | 3/1995 | Harriman, Jr. |
| 5,917,821 | A | 6/1999 | Gobuyan et al. |

(Continued)

FOREIGN PATENT DOCUMENTS

| | | |
|---|---|---|
| JP | 2003046566 A | 2/2003 |
| JP | 2008236378 A | 10/2008 |

OTHER PUBLICATIONS

Jonathan. R. Santos, "Reducing the Network Load of Replicated Data," MIT Dissertation, Massachusetts Institute of technology, May 1998, p. 10-40.*

(Continued)

*Primary Examiner* — Alpus H Hsu
*Assistant Examiner* — Anthony Luo
(74) *Attorney, Agent, or Firm* — Cantor Colburn LLP; Steven Chiu

(57) ABSTRACT

A computer-implemented method that includes creating a master copy of a header for all packets of a data transmission event, the master copy including a plurality of intact constant header information, the plurality of intact constant header information being constant for all packets of the data transmission event, storing unique header information for all packets of the data transmission event, the unique header information including information unique to at least one packet of the data transmission event, tokenizing identities of each packet of the data transmission event to create a tokenized packet ID for each packet, and indexing the stored unique header information based on the tokenizing. According to the method, at packet read-time, unique header information associated with the packet is overlayed onto the master copy to create a unique packet.

3 Claims, 6 Drawing Sheets

(51) Int. Cl.
    *H04J 3/24*         (2006.01)
    *G06F 15/16*      (2006.01)
    *G06F 3/00*        (2006.01)
    *G06F 12/00*      (2006.01)
    *H04L 29/06*      (2006.01)
    *H04L 12/26*      (2006.01)

(56) References Cited

U.S. PATENT DOCUMENTS

| | | |
|---|---|---|
| 6,594,280 B1 | 7/2003 | Chapman |
| 7,032,035 B2 | 4/2006 | Gaur |
| 7,114,031 B2 | 9/2006 | Lin et al. |
| 7,386,627 B1 | 6/2008 | Lango et al. |
| 7,492,771 B2 | 2/2009 | Basso et al. |
| 7,843,919 B2 | 11/2010 | Cadigan, Jr. et al. |
| 7,899,020 B2 | 3/2011 | Sala et al. |
| 8,670,531 B2 * | 3/2014 | Katis et al. ............ 379/93.01 |
| 2006/0075142 A1 | 4/2006 | Cornett et al. |
| 2010/0050256 A1 | 2/2010 | Knapp et al. |
| 2010/0172294 A1 * | 7/2010 | Toyokawa ................ 370/328 |
| 2010/0217822 A1 | 8/2010 | Katis et al. |
| 2011/0019617 A1 * | 1/2011 | Ho et al. .................. 370/328 |
| 2011/0187926 A1 * | 8/2011 | Kim et al. ................ 348/497 |
| 2011/0200045 A1 * | 8/2011 | Baehre .................... 370/392 |

OTHER PUBLICATIONS

J.R. Santos, "Reducing the Network Load of Replicated Data," MIT Dissertation, 1998.

UK International Search Report dated Feb. 3, 2014, Application No. GB1321187.5; 3 pages.

A. Amagami, et al., "Adjustment of Transmission Timing Between Multiple NICs" IEICE Technical Report, The Institute of Electronics Information and Commuication Engineers, vol. 104, No. 273; pp. 75-78.

I. Shinichi, et al., "Structure and Evaluation of Network Processor for Next Generation Internet Router: P-Gear" IEICE Technical Report, The Institute of Electronics Information aqnd Communication Engineers, vol. 105, No. 453, pp. 19-24.

* cited by examiner

US 8,982,886 B2

MEMORY SAVING PACKET MODIFICATION

CROSS-REFERENCE TO RELATED APPLICATION

This application is a continuation of U.S. patent application Ser. No. 13/117,345, filed May 27, 2011, the content of which is hereby incorporated by reference in its entirety.

BACKGROUND

The present invention relates to data packets, and more specifically, to packet modification to reduce storage of duplicated data.

BRIEF SUMMARY

According to one embodiment of the present invention, a computer-implemented method includes creating a master copy of a header for all packets of a data transmission event, the master copy including a plurality of intact constant header information, the plurality of intact constant header information being constant for all packets of the data transmission event, storing unique header information for all packets of the data transmission event, the unique header information including information unique to at least one packet of the data transmission event, tokenizing identities of each packet of the data transmission event to create a tokenized packet ID for each packet, and indexing the stored unique header information based on the tokenizing.

According to another embodiment of the present invention, a computer-implemented method includes receiving a request for packet transmission during a data transmission event, creating a packet using a master copy of a packet header, the master copy including a plurality of intact constant header information, the plurality of intact constant header information being constant for all packets of the data transmission event, overlaying unique header information associated with the packet onto the master copy to create a unique packet, the unique header information including information unique to at least one packet of the data transmission event, and transmitting the unique packet.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Generally, the transmission of large amounts of information and data across a computer system or systems requires this information to be separated into packets suitable for transport. Headers associated with each packet may include a plurality of fields of information necessary for proper routing of each packet. It is appreciated that according to any computer system, one or more of these fields may include the same information for a plurality of packets. More clearly, many of these fields may be constant for all packets associated with a particular transmission event. Additionally, other fields may include unique information particular to an individual packet. Technical effects and benefits of example embodiments of the present invention include a reduction in the duplication of the constant header data while retaining unique information for packets transmission, resulting in significantly less data storage overhead as compared to conventional systems.

Figure 1:
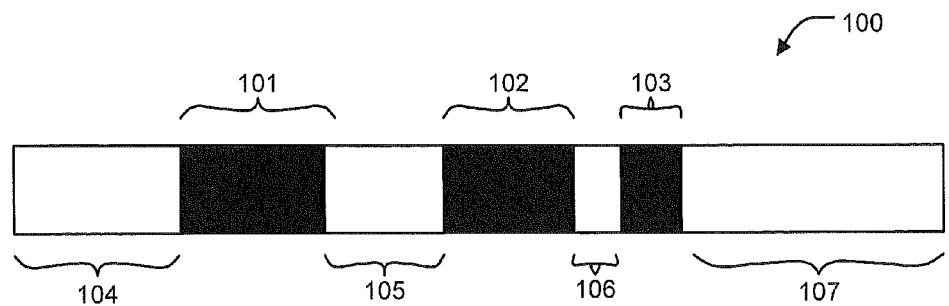
FIG. 1 illustrates a packet header.
Figure 2:
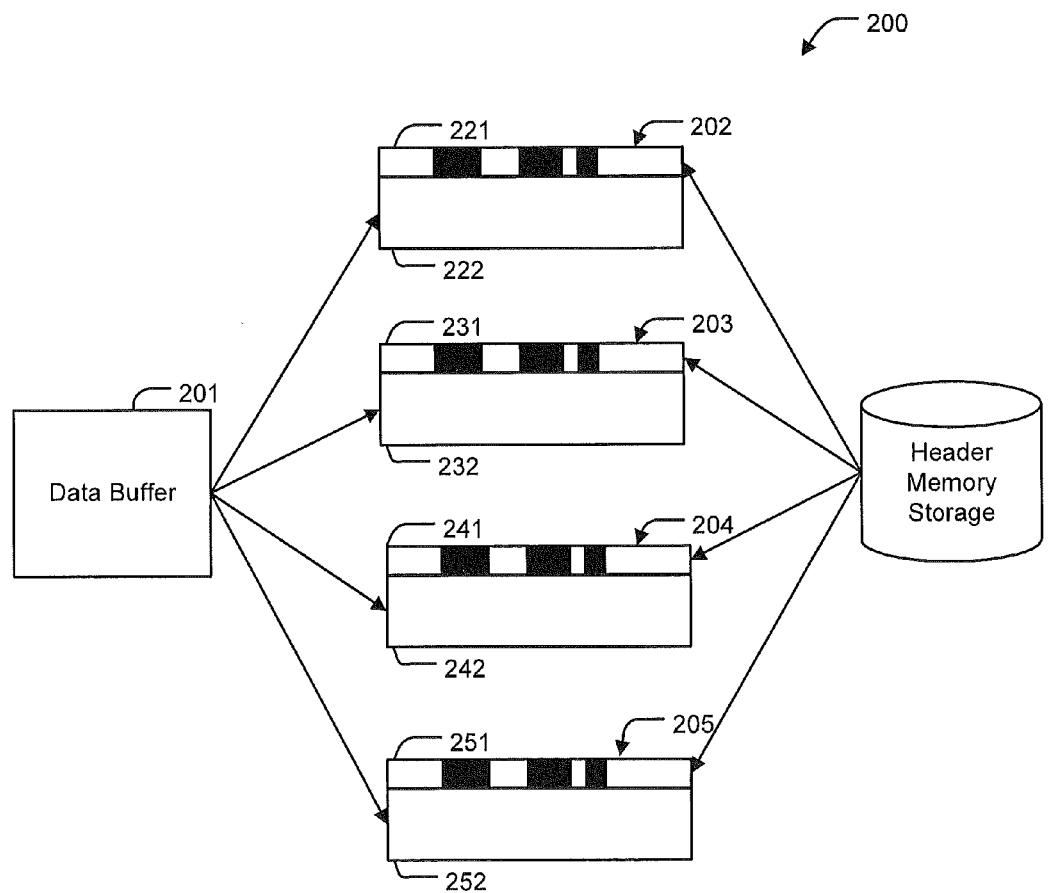
FIG. 2 illustrates a packet forming system.

Turning to FIG. 1, packet header 100 is illustrated. As shown, the header 100 includes a plurality of data fields 101, 102, 103, 104, 105, 106, and 107. Header fields 101, 102, and 103 are unique header fields, which include information unique to a data packet portion associated with the header 100 (not illustrated). Header fields 104, 105, 106, and 107 are header fields which are constant across all packets associated with a particular data transmission event. It can be appreciated that as a number of packet headers for a particular data transmission event increase, so increases an amount of storage necessary for storing all of the associated headers. For example, turning to FIG. 2, a packet forming system is illustrated.

The system 200 includes a data buffer 201. The data buffer 201 is configured to store a plurality of information for transmission. Therefore, the information stored in data buffer 201 is segmented into a plurality of packets 202, 203, 204, and 205. Each portion of the segmented data is appended to packets 202, 203, 204, and 205 as packet data portions 222, 232, 242, and 252, respectively.

The system 200 also includes header memory storage 206. The header memory storage 206 is configured to store a plurality of complete packet headers 221, 231, 241, and 251 for appending to associated packets 202, 203, 204, and 205.

As illustrated, the packet forming system 200 is configured to create a plurality of packets from packet data information stored in the data buffer 201 and complete header information stored in header memory storage 206. Therefore, it can again be appreciated that as a number of packets for a particular data transmission event increase, so increases an amount of storage necessary within header memory storage 206 for storing all of the associated headers. However, example embodiments of the present invention overcome these drawbacks through intelligent identification, packet modification, and packet creation.

Figure 3:
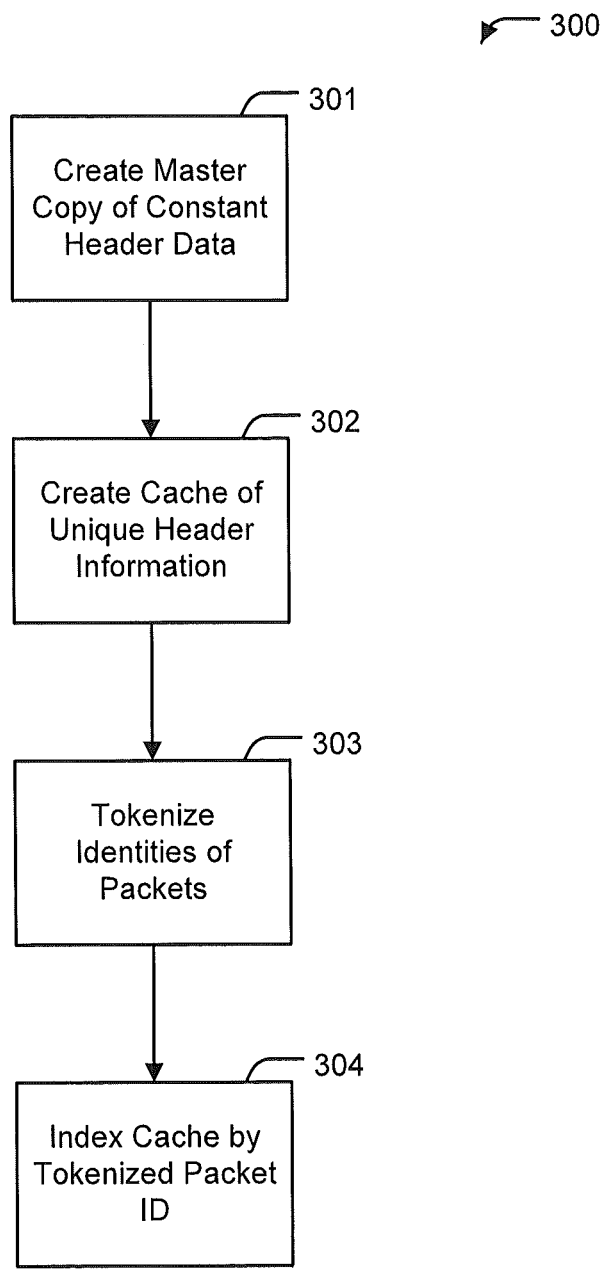
FIG. 3 illustrates a method of packet modification, according to an example embodiment of the present invention.

Turning to FIG. 3, a method 300 of packet modification is illustrated. The method 300 includes creating a master copy of constant header data for a data transmission event at block 301. The constant header information is header information which is constant across all headers for data packets of the data transmission event. The master copy may be created as a single header template with all constant information being correctly assembled therein.

The method 300 further includes creating a cache of unique header information (e.g., storing unique header information) at block 302 for the data transmission event. The unique header information is header information which differs across headers for data packets of the data transmission event. The unique header information may be assembled into the cache based upon an associated unique tokenized packet ID.

The method 300 further includes tokenizing identities of packets with unique header information at block 303 and indexing the cache/stored unique header information by the tokenized packet IDs at block 304. The tokenizing may be performed according to any suitable tokenizing algorithm. Furthermore, the indexing may be performed based on any suitable algorithm allowing for efficient organization and retrieval of associated unique header information.

It is appreciated that as the method 300 provides only a single copy of constant header information, total storage for constant header information is decreased dramatically. Furthermore, as unique header information is cached according to tokenized packet IDs, unique header information retrieval for packet formation is efficient. For example, FIG. 4 illustrates a packet forming method 400, according to an example embodiment of the present invention.

The method 400 includes receiving a request for packet transmission at block 401. In response to the request, the method 400 includes creating a packet with constant header information at block 402. The packet may be created by appending the master copy of constant header information to a packet data portion to create a full data packet.

The method 400 further includes retrieving unique header information from a unique information cache at block 403. For example, a tokenized packet ID for the packet may be used to identify associated unique header information, and the associated unique header information may be retrieved by traversing a cache to locate the information based on the tokenized packet ID. Thereafter, the method 400 includes overlaying the master copy of the constant header information with the retrieved unique header information at block 404 to form the final data packet and transmitting the final data packet at block 405. More clearly, block 404 includes overlaying unique header information onto the master copy to create a unique header.

Figure 4:
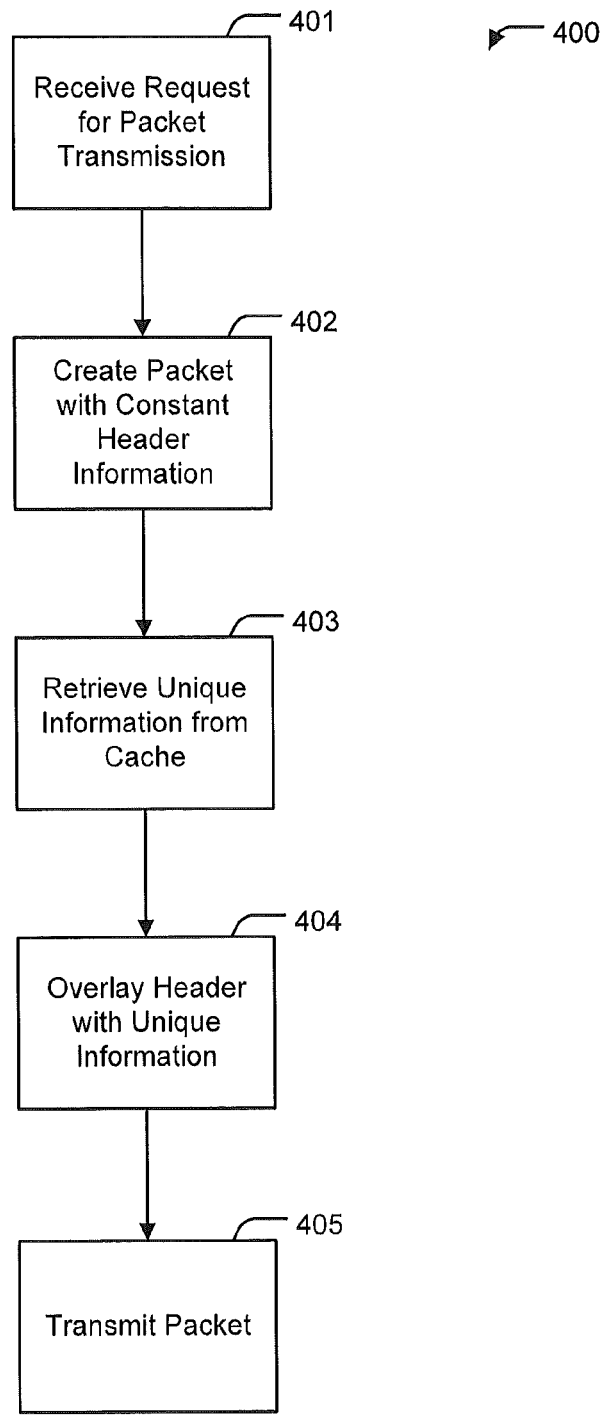
FIG. 4 illustrates a method of packet forming, according to an example embodiment of the present invention.
Figure 5:
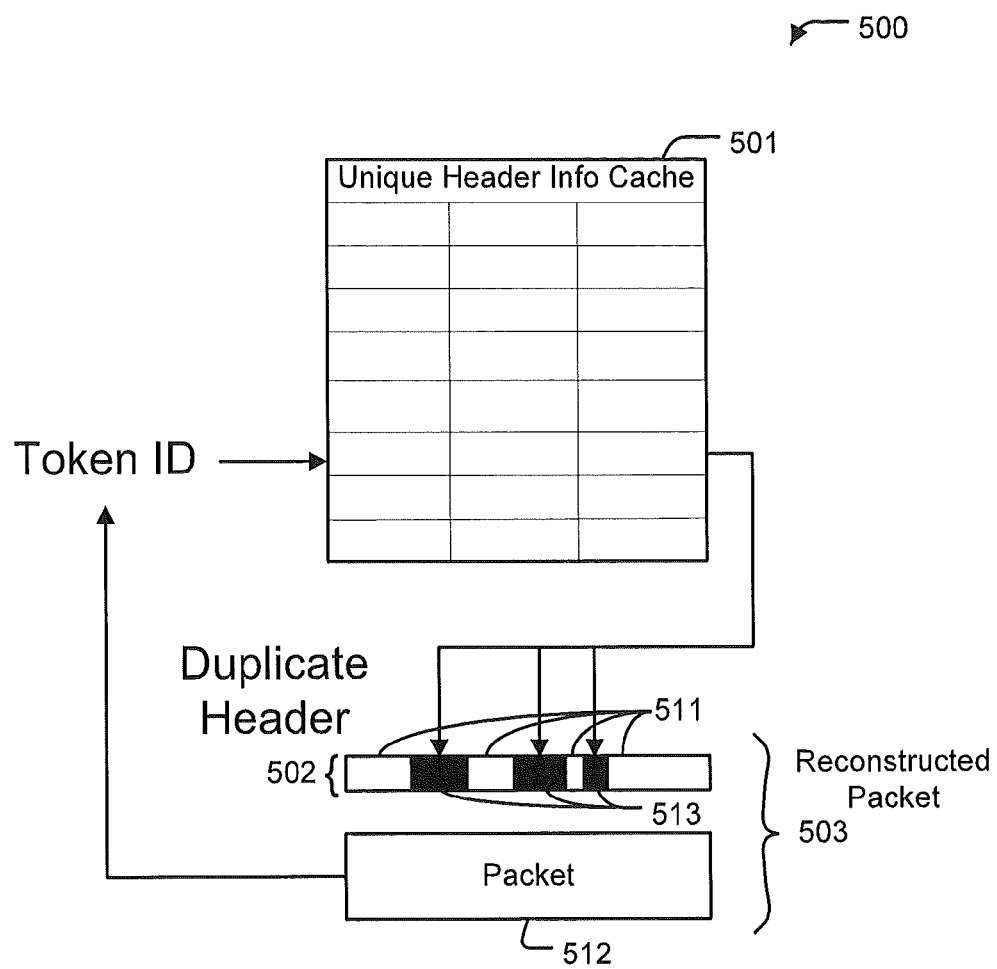
FIG. 5 illustrates a packet forming system, according to an example embodiment of the present invention.

In order to better understand the methodology of FIG. 4, reference is made to FIG. 5 in which a packet forming system is illustrated. According to the system 500, a tokenized Packet ID of a packet 512 is used by a packet forming portion of the system to retrieve unique header information from the unique header information cache/memory 501. The retrieved unique information includes a plurality of header data fields 513. The header data fields 513 are overlayed on top of the master constant header 502, leaving constant header data fields 511 intact and thereby creating reconstructed packet 503 for transmission.

Therefore, as described above, example embodiments of the present invention provide methods and systems of packet modification and creation which reduce an amount of memory necessary for packet transmission. According to example embodiments, a single master copy of constant header information is stored for a data transmission event. Unique information is overlayed onto the master copy during packet read/transmission time. Therefore, overall storage requirements are reduced dramatically.

Figure 6:
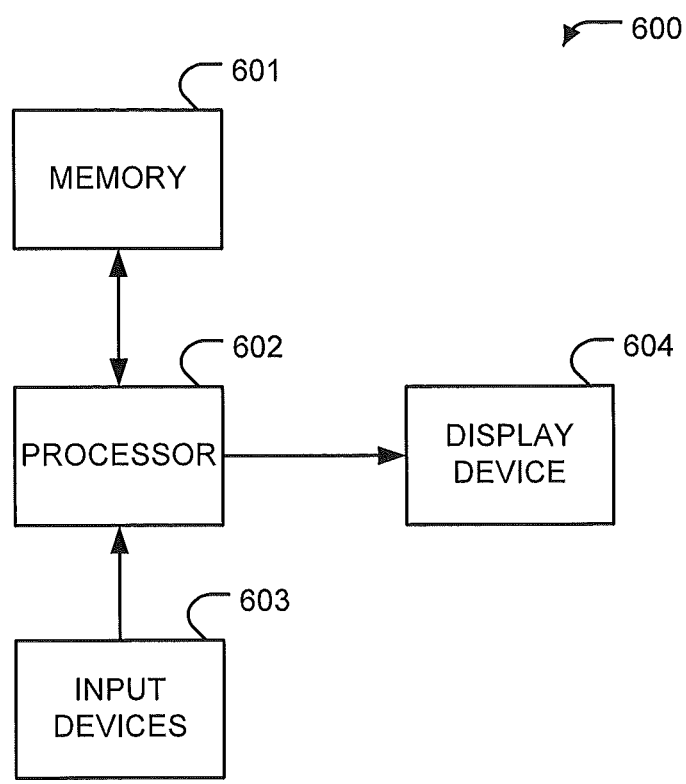
FIG. 6 illustrates a computer apparatus.

The methods of packet modification and creation described above may be embodied as computer executable instructions executable by a computer apparatus, for example, as illustrated in FIG. 6. Thus, portions or the entirety of the methods provided herein may be executed by any apparatus at least somewhat similar to the computer apparatus 600. For example, instructions depicting portions of a method may be stored in the memory 601 for execution by general purpose computer processor 602. Feedback may be provided through input devices 603 and relevant output may be displayed at display device 604.

Figure 7:
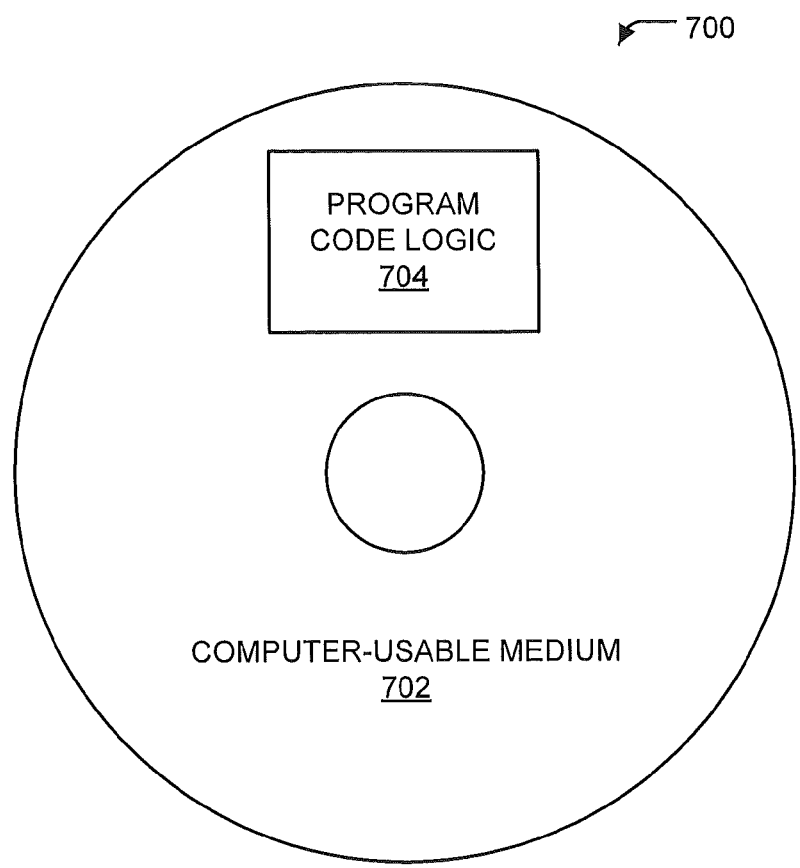
FIG. 7 illustrates a computer program product.

Furthermore, portions or the entirety of the methods described herein may be readily distributed as a computer program product, for example, as illustrated in FIG. 7. According to FIG. 7, a computer program product 700 may include a computer-usable storage medium 702 configured to store program code logic 704. The program code logic 704 may include computer executable instructions that, when executed by a computer processor, direct the computer processor to perform a method as described herein.

It is noted that the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method, comprising:
creating a master copy of a header for all packets of a data transmission event, the master copy including a plurality of intact constant header information, the plurality of intact constant header information being constant for all packets of the data transmission event;
storing unique header information for all packets of the data transmission event in a cache memory, the unique header information including information unique to at least one packet of the data transmission event;
tokenizing packet IDs of each packet of the data transmission event to create a tokenized packet ID for each packet;

indexing the stored unique header information for all packets of the data transmission event in the cache memory based on the tokenizing;

retrieving the stored unique header information for a first packet from the cache memory based on the indexing; and creating the first packet using the master copy of the header and associated unique header information by overlaying the unique header information that was retrieved from the cache memory onto the master copy of the header.

2. The method of claim 1, further comprising:

receiving a request for packet transmission from a receiving computer system; and transmitting the first packet to the receiving computer system based on the received request.

3. The method of claim 2, wherein creating the packet further includes appending the master copy of the header with the overlaid unique header information to associated packet data, the associated packet data being retrieved from a data buffer, to create a full data packet.

* * * * *